US012561294B2

(12) United States Patent
Groenewegen et al.

(10) Patent No.: US 12,561,294 B2
(45) Date of Patent: Feb. 24, 2026

(54) SOFTWARE QUALITY TICKET ENRICHMENT

(71) Applicant: Microsoft Technology Licensing, LLC, Redmond, WA (US)

(72) Inventors: Peter Groenewegen, Sammamish, WA (US); Nikola Minkov Mihaylov, Redmond, WA (US); Larissa Marie Cox, Seattle, WA (US); Nicholas Taylor Mullen, Seattle, WA (US); Mark Alistair Wilson-Thomas, Mercer Island, WA (US); Paul Chapman, Seattle, WA (US); Kshama Gajraj Bafna, Woodinville, WA (US); Abhishek Kumar, Folsom, CA (US); Jason Chlus, Hoboken, NJ (US); Holly Mitchell, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/242,464

(22) Filed: Sep. 5, 2023

(65) Prior Publication Data

US 2025/0077487 A1     Mar. 6, 2025

(51) Int. Cl.
*G06F 16/215* (2019.01)
*G06F 16/2457* (2019.01)
*G06F 16/951* (2019.01)

(52) U.S. Cl.
CPC ...... *G06F 16/215* (2019.01); *G06F 16/24578* (2019.01); *G06F 16/951* (2019.01)

(58) Field of Classification Search
CPC . G06F 16/215; G06F 16/24578; G06F 16/951
(Continued)

(56) References Cited

U.S. PATENT DOCUMENTS

| | | | |
|---|---|---|---|
| 6,741,959 B1 * | 5/2004 | Kaiser | G06F 16/3347 |
| | | | 707/999.005 |
| 10,938,678 B2 * | 3/2021 | Ghosh | G06F 40/295 |

(Continued)

FOREIGN PATENT DOCUMENTS

| | | |
|---|---|---|
| CN | 103246603 A | 8/2013 |
| CN | 102629230 B | 4/2015 |

(Continued)

OTHER PUBLICATIONS

Ahsan, et al., "Automatic Software Bug Triage System (BTS) Based on Latent Semantic Indexing and Support Vector Machine", In Proceedings of Fourth International Conference on Software Engineering Advances, Sep. 20, 2009, pp. 216-221.

(Continued)

*Primary Examiner* — Joshua Bullock
(74) *Attorney, Agent, or Firm* — Wade IP Law PLLC

(57) ABSTRACT

Searches based on an incoming ticket identify quality ticket enrichment data using a vector database. Language model prompts target particular kinds of quality ticket data. The incoming quality ticket, or a search result ticket, or both, are enriched using enrichment data, such as a user intent identification, a workaround suggestion, a resolution description, a target audience description, a relevance description, an impact description, a description of missing resolution facilitation information, an association between the incoming quality ticket and the search result ticket, a user sentiment identification, a tag suggestion, or a feedback utility estimate. The enrichment reduces engineering and support burdens, and facilitates faster more effective resolution of the problem or the request that is stated or implied in the incoming quality ticket. Duplicate tickets are merged or removed. Tickets are prioritized. Missing problem resolution information is identified and requested sooner.

20 Claims, 3 Drawing Sheets

ENHANCED SYSTEM <u>102, 202</u> WITH FUNCTIONALITY <u>204</u> FOR ENRICHING <u>206</u> QUALITY TICKETS <u>134</u>

VECTOR <u>208</u> DATABASE <u>210</u>

LANGUAGE MODEL <u>212</u> INTERFACE <u>214</u>

(58) Field of Classification Search

USPC .......................................................... 707/709

See application file for complete search history.

(56) References Cited

U.S. PATENT DOCUMENTS

| | | | | |
|---|---|---|---|---|
| 2015/0006519 | A1* | 1/2015 | Jain ......................... | G06F 40/30 |
| | | | | 707/723 |
| 2018/0121808 | A1 | 5/2018 | Ramakrishna et al. | |
| 2018/0275986 | A1 | 9/2018 | Ghosh et al. | |
| 2019/0073293 | A1* | 3/2019 | Sharma ................... | G06F 16/22 |
| 2019/0318204 | A1* | 10/2019 | Mishra ................... | G06N 20/00 |
| 2020/0065151 | A1* | 2/2020 | Ghosh ................... | G06F 40/295 |
| 2020/0151583 | A1* | 5/2020 | Mueller ............... | G06Q 30/016 |
| 2020/0304364 | A1 | 9/2020 | Tapia et al. | |
| 2021/0157985 | A1* | 5/2021 | Rotkop ................. | G06F 40/205 |
| 2021/0158146 | A1* | 5/2021 | Singh ........................ | G06N 3/08 |
| 2021/0166081 | A1* | 6/2021 | Storey ................... | G06T 7/0004 |
| 2021/0328888 | A1* | 10/2021 | Rath ................... | H04L 41/5074 |
| 2022/0036370 | A1* | 2/2022 | Rodman ............. | G06Q 30/016 |
| 2022/0215328 | A1* | 7/2022 | Chen ....................... | G06N 20/00 |
| 2023/0100605 | A1* | 3/2023 | Singh ....................... | G06N 5/01 |
| | | | | 706/12 |

FOREIGN PATENT DOCUMENTS

| | | | |
|---|---|---|---|
| CN | 113721960 | A | 11/2021 |
| CN | 115357288 | A | 11/2022 |
| EP | 4107622 | A1 | 12/2022 |
| WO | 2017041372 | A1 | 3/2017 |

OTHER PUBLICATIONS

Eriksson, et al., "NLP-Assisted Workflow Improving Bug Ticket Handling", In Thesis of School of Electrical Engineering and Computer Science, Sep. 6, 2021, 17 Pages.

Liu, et al., "Ticket-BERT: Labeling Incident Management Tickets with Language Models", In Repository of arXiv preprint arXiv:2307.00108, Retrieved Date: Apr. 4, 2023, pp. 1-12.

Mishra, et al., "Automatic Title Generation for Text with Pre-trained Transformer Language Model", In Proceedings of IEEE 15th International Conference on Semantic Computing, Jan. 27, 2021, pp. 17-24.

Sobania, et al., "An Analysis of the Automatic Bug Fixing Performance of ChatGPT", In Repository of arXiv:2301.08653v1, Jan. 20, 2023, 8 Pages.

"Automatic summarization", retrieved from << https://en.wikipedia.org/wiki/Automatic_summarization >>, Jul. 23, 2023, 15 pages.

"Content similarity detection", retrieved from << https://en.wikipedia.org/wiki/Content_similarity_detection >>, Jul. 24, 2023, 12 pages.

"Sentiment analysis", retrieved from << https://en.wikipedia.org/wiki/Sentiment_analysis >>, Jul. 22, 2023, 16 pages.

"Large language model", retrieved from << https://en.wikipedia.org/wiki/Large_language_model >>, Jul. 31, 2023, 21 pages.

"User intent", retrieved from << https://en.wikipedia.org/wiki/User_intent >>, May 17, 2023, 3 pages.

McKay Christensen, "How to Write an Effective Bug Report That Actually Gets Resolved (and Why Everyone Should)", retrieved from << https://www.lucidchart.com/blog/how-to-write-an-effective-bug-report-that-actually-gets-resolved-and-why-everyone-should >>, no later than Aug. 21, 2023, 21 pages.

* cited by examiner

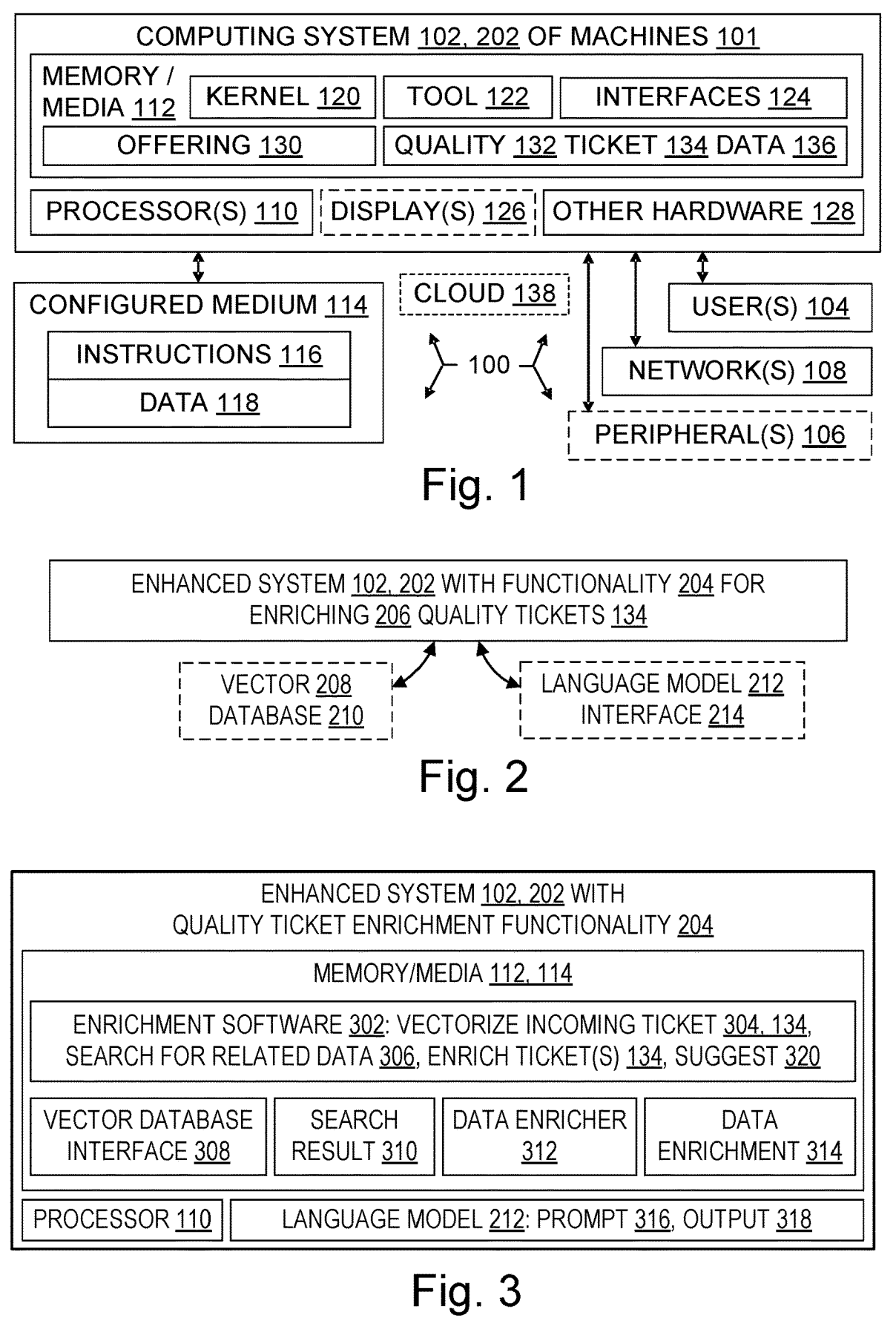

COMPUTING SYSTEM 102, 202 OF MACHINES 101

MEMORY / MEDIA 112 | KERNEL 120 | TOOL 122 | INTERFACES 124

OFFERING 130 | QUALITY 132 TICKET 134 DATA 136

PROCESSOR(S) 110 | DISPLAY(S) 126 | OTHER HARDWARE 128

CONFIGURED MEDIUM 114

INSTRUCTIONS 116

DATA 118

CLOUD 138

} 100 {

USER(S) 104

NETWORK(S) 108

PERIPHERAL(S) 106

Fig. 1

ENHANCED SYSTEM 102, 202 WITH FUNCTIONALITY 204 FOR ENRICHING 206 QUALITY TICKETS 134

VECTOR 208 DATABASE 210

LANGUAGE MODEL 212 INTERFACE 214

Fig. 2

ENHANCED SYSTEM 102, 202 WITH
QUALITY TICKET ENRICHMENT FUNCTIONALITY 204

MEMORY/MEDIA 112, 114

ENRICHMENT SOFTWARE 302: VECTORIZE INCOMING TICKET 304, 134,
SEARCH FOR RELATED DATA 306, ENRICH TICKET(S) 134, SUGGEST 320

VECTOR DATABASE INTERFACE 308 | SEARCH RESULT 310 | DATA ENRICHER 312 | DATA ENRICHMENT 314

PROCESSOR 110 | LANGUAGE MODEL 212: PROMPT 316, OUTPUT 318

Fig. 3

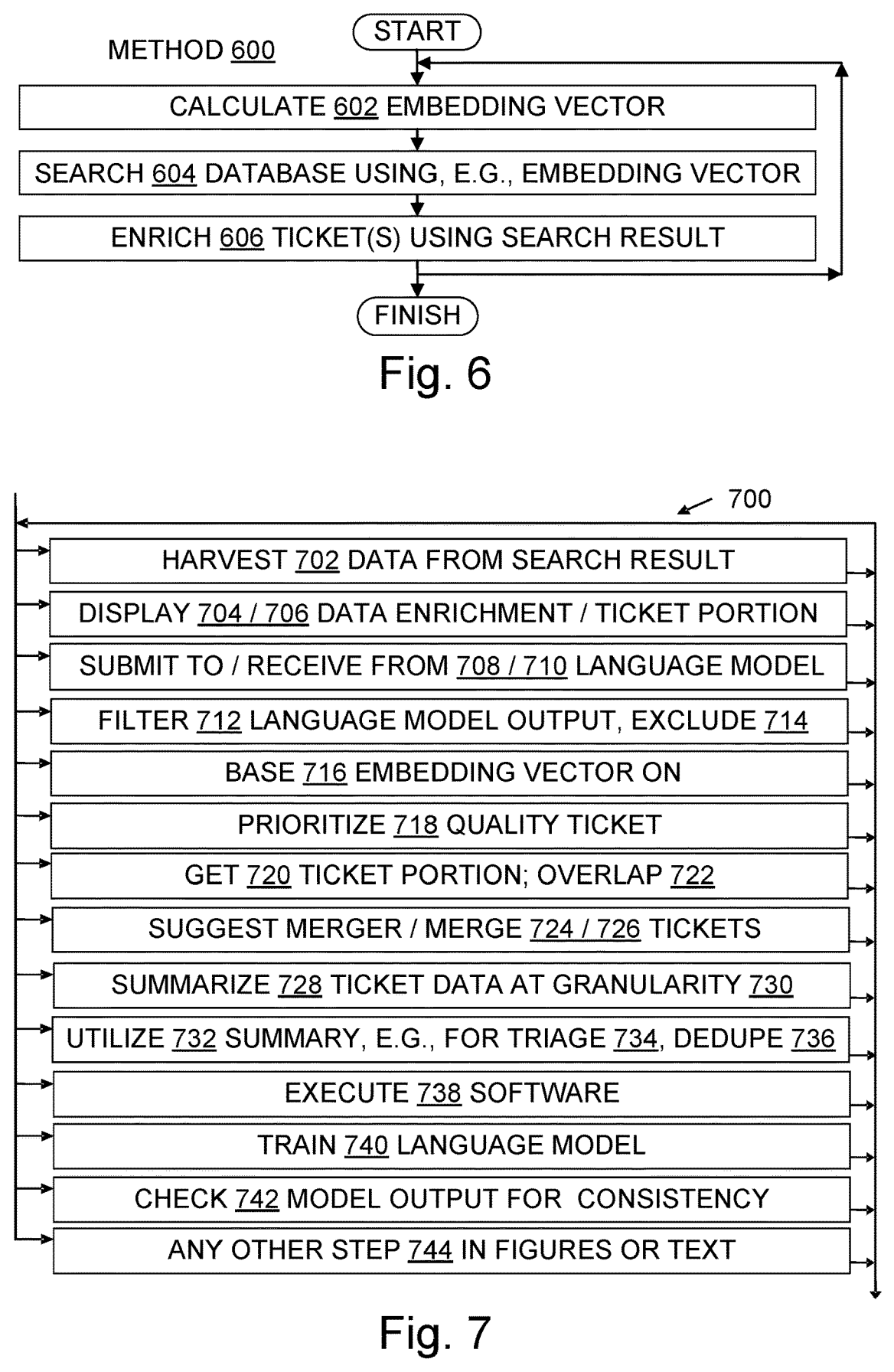

METHOD 600

START

CALCULATE 602 EMBEDDING VECTOR

SEARCH 604 DATABASE USING, E.G., EMBEDDING VECTOR

ENRICH 606 TICKET(S) USING SEARCH RESULT

FINISH

HARVEST 702 DATA FROM SEARCH RESULT

DISPLAY 704 / 706 DATA ENRICHMENT / TICKET PORTION

SUBMIT TO / RECEIVE FROM 708 / 710 LANGUAGE MODEL

FILTER 712 LANGUAGE MODEL OUTPUT, EXCLUDE 714

BASE 716 EMBEDDING VECTOR ON

PRIORITIZE 718 QUALITY TICKET

GET 720 TICKET PORTION; OVERLAP 722

SUGGEST MERGER / MERGE 724 / 726 TICKETS

SUMMARIZE 728 TICKET DATA AT GRANULARITY 730

UTILIZE 732 SUMMARY, E.G., FOR TRIAGE 734, DEDUPE 736

EXECUTE 738 SOFTWARE

TRAIN 740 LANGUAGE MODEL

CHECK 742 MODEL OUTPUT FOR CONSISTENCY

ANY OTHER STEP 744 IN FIGURES OR TEXT

Fig. 7

SOFTWARE QUALITY TICKET ENRICHMENT

BACKGROUND

Many modern devices in a broad range of fields have some form of computing power, and operate according to software instructions that execute using that computing power. Other devices are entirely hardware, sometimes but not always with moving parts or electronics or both. Many other products are also widely used. A few of the many examples of items whose behavior depends on software or hardware or both, or on other design or composition or manufacturing choices, include cars, planes, ships and other vehicles, robotic manufacturing tools and other industrial systems, construction tools, medical devices, cameras, inventory management and other retail or wholesale systems, smartphones, tablets, servers, workstations and other devices which connect to the Internet, diagnostic tools, device subsystems, device component parts, cosmetics products and tools, entertainment devices, movies, books, music, food, services, and a vast array of products sold online.

The software programs and hardware and constituent parts which guide or provide various behaviors and characteristics of these and many other items, including services and goods, are developed by people who are known as designers, artists, developers, programmers, engineers, or coders, for example, or by other names; they are referred to collectively here as "developers". As they develop a good or a service or its components, developers make numerous choices which ultimately influence the quality of the good or the service, e.g., cost, reliability, speed, ease of use, durability, safety, interaction with other goods or services, security, privacy, performance characteristics, or functionality.

Billions of services and goods of various kinds, configured in different ways, have been deployed or utilized in a wide variety of environments, for many years. During recent decades, it has been possible for consumers and other users of goods and services to electronically submit reviews, bug reports, feature requests, survey responses, feedback, and other information about the quality of a good or a service to a vendor, distributor, or manufacturer. These submissions are referred to as tickets, comments, reviews, or reports, or by other names. However, improvements in technology for handling electronic submissions regarding the quality of a good or a service are still possible.

SUMMARY

Some embodiments address a basic challenge of using quality tickets as a source of actionable feedback: different people often describe the same or similar problems or goals in very different ways. Some embodiments utilize searches based on vector embeddings, or directed transformations by language models, or both, in order to find or create or leverage relationships between different descriptions of similar problems. Some embodiments use vectors or language models or both to find, or to fill, gaps in the information that was provided by a quality ticket. As a result, embodiments improve the usability, effectiveness, and overall quality of user feedback systems.

Some embodiments search a vector database for quality ticket data which relates to an incoming quality ticket. The vector database contains, or is otherwise associated with, quality ticket data such as data enrichment content (examples below) or language model prompts. Then the embodiment enriches a ticket with a data enrichment. The enriched ticket is the incoming quality ticket, or a search result ticket, or both. The search result ticket is a result of searching the vector database. The data enrichment includes at least one of: a user intent identification, a workaround suggestion, a resolution description, a target audience description, a relevance description, an impact description, a description of missing resolution facilitation information, an association between the incoming quality ticket and the search result ticket, a user sentiment identification, a tag suggestion, or a feedback utility estimate. The data enrichment facilitates faster and more effective resolution of the problem or the request that is stated or implied in the incoming quality ticket.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. Subject matter scope is defined with claims as properly understood, and to the extent this Summary conflicts with the claims, the claims should prevail.

BRIEF DESCRIPTION OF THE DRAWINGS

A more particular description will be given with reference to the attached drawings. These drawings only illustrate selected aspects and thus do not fully determine coverage or scope.

FIG. 1 is a diagram illustrating aspects of computer systems and also illustrating configured storage media, including some aspects generally suitable for systems which provide quality ticket enrichment functionality;

FIG. 2 is a block diagram illustrating an enhanced system configured with quality ticket enrichment functionality;

FIG. 3 is a block diagram illustrating aspects of a system enhanced with quality ticket enrichment functionality;

FIG. 6 is a flowchart illustrating steps in a quality ticket enrichment method; and FIG. 7 is a flowchart further illustrating steps in some quality ticket enrichment methods, and incorporating FIG. 6.

DETAILED DESCRIPTION

Overview

Figure 4:
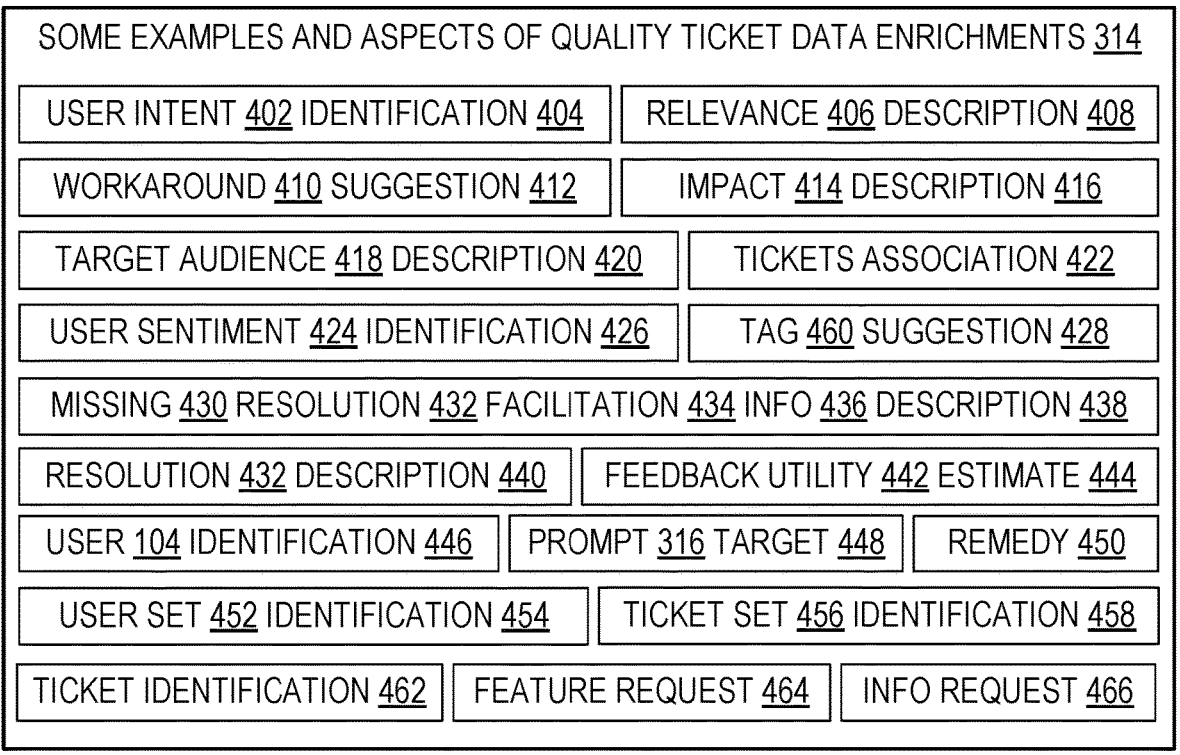
FIG. 4 is a block diagram illustrating some examples and aspects of quality ticket data enrichments.

Some teachings described herein were motivated by technical challenges faced during efforts to improve technology for user feedback in computing systems. In particular, challenges were faced during efforts to improve bug reporting technology. These challenges were motivations for the present disclosure, but teachings herein are not limited in their scope or applicability to those particular motivational challenges. For example, embodiments are not limited to the enrichment of bug reports, or to the enrichment of software quality tickets. Some embodiments go beyond bug reports to encompass feature requests, for example, and some embodiments go beyond software quality tickets to encompass quality tickets regarding other goods or services.

After investigating and considering some challenges of user feedback technology, several conclusions were reached.

One conclusion is that writing a good actionable bug report is difficult for people. Another conclusion is that sometimes another bug report is not required in order to resolve a bug. A third conclusion is that when an enterprise can more easily match bug reports to one another, e.g., by using artificial intelligence (AI) or vector databases as taught herein, users will spend less time and effort writing bug reports, and the enterprise will spend less time and effort triaging bug reports.

Embodiments described herein provide efficient, effective, and fast alternatives to an approach in which, for example, a user enters a ticket, the ticket is forwarded to a human engineer, the engineer reviews the ticket and decides that some additional information would be helpful, the engineer writes a request for the additional information, and the engineer's request is sent back and displayed to the user. Without the present embodiments, a cycle time of hours or even days routinely passes between the time the user starts entering the ticket and the time the request for additional information is displayed to the user.

Some embodiments taught herein reduce that cycle time to less than five minutes, and in some cases to less than one minute. This speedup is accomplished using various mechanisms, such as vectorization of the ticket content, searches of vector databases concurrently with entry of the ticket by the user, and use of targeted AI language model prompts to automatically and proactively identify helpful information in previous tickets and to determine which information that is currently missing from the incoming ticket would be helpful, for example.

In short, one technical challenge is how to make it easier to match duplicate bug reports or other tickets. For instance, wide variations in the length and level of detail of user feedback submissions occur even when users are reporting the same problem, which makes it difficult to automatically associate the two reports with that problem and with each other. Another technical challenge is how to give users suggestions when they are writing a bug report or another ticket, including suggestions that potentially solve their problem without the enterprise committing resources to investigate the problem further. Some embodiments taught herein leverage AI or vectorized database searches or both, to help users write better issue reports, to deduplicate tickets, or to resolve an issue before it is added to an engineering team task list as new issue.

Some embodiments described herein utilize or provide functionality which searches a vector database for quality ticket data which relates to an incoming quality ticket, the vector database having associated quality ticket data. For example, some embodiments generate an embedding vector from a quality ticket title as the ticket is being entered by a user, and then search a database containing vectors formed from other quality ticket titles, vectors formed from quality ticket bodies, or both. This vector database search functionality has the technical benefit of matching tickets that contain similar but not necessarily identical descriptions of problems or product features. Matching similar tickets helps deduplicate tickets. Ticket deduplication saves users from creating tickets that would cover issues previously identified, and saves engineering and computational resources by avoiding duplicate efforts to address a given issue.

Some embodiments described herein utilize or provide functionality which submits at least a portion of an incoming quality ticket to a language model with a prompt that targets data enrichment, and in response receive at least a portion of a data enrichment from the language model, which is then utilized to enrich a quality ticket. The enrichment enriches the incoming quality ticket, or a preexisting quality ticket, or both. This AI-based ticket enrichment functionality has the technical benefit of producing ticket enrichment data that improves the efficiency and effectiveness of problem resolution in user feedback systems while reducing the burden on human engineering resources.

For instance, in some scenarios a trained and prompted language model produces a description of resolution facilitation information that is missing from the incoming ticket, such as logs, screenshots, or instructions on how to reproduce a problem. The user is then asked to provide this information, at the time of ticket creation instead of routing the incomplete ticket to an engineer who then requests the information hours or even days later. This AI-based ticket enrichment functionality has the technical benefit of reducing demands on engineers. This AI-based ticket enrichment functionality also has the technical benefit of collecting resolution facilitation information that becomes unavailable later and thus would not have been collected if the incomplete ticket had merely been routed to an engineer instead of being enhanced using language model output and displayed to the user at the time of ticket creation.

In some embodiments, a trained and prompted language model produces, from the incoming ticket itself without reliance on other tickets or database search results, a data enrichment which includes a user intent identification. This AI-based ticket enrichment functionality has the technical benefit of helping deduplicate tickets when other tickets have an overlapping user intent identification. Moreover, user intent identification facilitates efficiency and effectiveness by separating tickets whose user intent is "report a problem" from tickets whose user intent is "request a feature", when problem fixes are handled by different engineers than the ones responsible for adding product features. Moreover, fixes are often on a different schedule and workflow than feature additions, so separating fix tickets from addition tickets early and automatically promotes efficiency.

In some embodiments, a trained and prompted language model produces, from the incoming ticket itself without reliance on other tickets or database search results, a data enrichment which includes a user sentiment identification. This AI-based ticket enrichment functionality has the technical benefit of helping prioritize or guide engineering tasks, or customer relation tasks, or both. A ticket whose identified user sentiment includes anger or frustration, for example, will undergo a different workflow than a ticket which is not marked by those sentiments.

In some embodiments, a quality ticket data enrichment includes a workaround suggestion, a resolution description, or both. This data enrichment is part of a language module output, or a vector database search result, or includes both. This data enrichment functionality has the technical benefit of helping users avoid submission of tickets when acceptable alternatives are available, which in turn conserves computational and personnel resources.

These and other benefits will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 138. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface 124 by using displays 126, keyboards 106, and other peripherals 106, via typed text, touch, voice, movement, computer vision, gestures, and/or other forms of I/O. Virtual reality or augmented reality or both functionalities are provided by a system 102 in some embodiments. A screen 126 is a removable peripheral 106 in some embodiments and is an integral part of the system 102 in some embodiments. The user interface supports interaction between an embodiment and one or more human users. In some embodiments, the user interface includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 138 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 122 include security tools or software applications, on mobile devices 102 or workstations 102 or servers 102, editors, compilers, debuggers and other software development tools, as well as APIs, browsers, or webpages and the corresponding software for protocols such as HTTPS, for example. Files, APIs, endpoints, and other resources may be accessed by an account or set of accounts, user 104 or group of users 104, IP address or group of IP addresses, or other entity. Access attempts may present passwords, digital certificates, tokens or other types of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory nor a computer-readable storage device is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one of more of: chiplets, hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUS, and/or quantum processors), memory/storage media 112, peripherals 106, and displays 126, some operating environments also include other hardware 128, such as batteries, buses, power supplies, wired and wireless network interface cards, for instance. The nouns "screen" and "display" are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud. In particular, quality ticket enrichment functionality 204 could be installed on an air gapped network and then be updated periodically or on occasion using removable media 114, or not updated at all. Some embodiments also communicate technical data or technical instructions or both through direct memory access, removable or non-removable volatile or nonvolatile storage media, or other information storage-retrieval and/or transmission approaches.

One of skill will appreciate that the foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current disclosure.

In any later application that claims priority to the current application, reference numerals may be added to designate items disclosed in the current application. Such items may include, e.g., software, hardware, steps, processes, systems, functionalities, mechanisms, data structures, computational resources, programming languages, tools, workflows, or algorithm implementations, or other items in a computing environment, which are disclosed herein but not associated with a particular reference numeral herein. Corresponding drawings may also be added.

More About Systems

FIG. 2 illustrates a computing system 102 configured by one or more of the quality ticket enrichment enhancements taught herein, resulting in an enhanced system 202. In some embodiments, this enhanced system 202 includes a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

FIG. 3 shows some aspects of some enhanced systems 202. This is not a comprehensive summary of all aspects of enhanced systems 202 or all aspects of quality ticket enrichment functionality 204. Nor is it a comprehensive summary of all aspects of an environment 100 or system 202 or other context of an enhanced system 202, or a comprehensive summary of any aspect of functionality 204 for potential use in or with a system 102. FIG. 3 items are discussed at various points herein, and additional details regarding them are provided in the discussion of a List of Reference Numerals later in this disclosure document.

FIG. 4 shows some examples and aspects of quality ticket data enrichments 314. This is not a comprehensive summary of all examples or aspects of quality ticket data enrichment. FIG. 4 items are discussed at various points herein, and additional details regarding them are provided in the discussion of a List of Reference Numerals later in this disclosure document.

Figure 5:
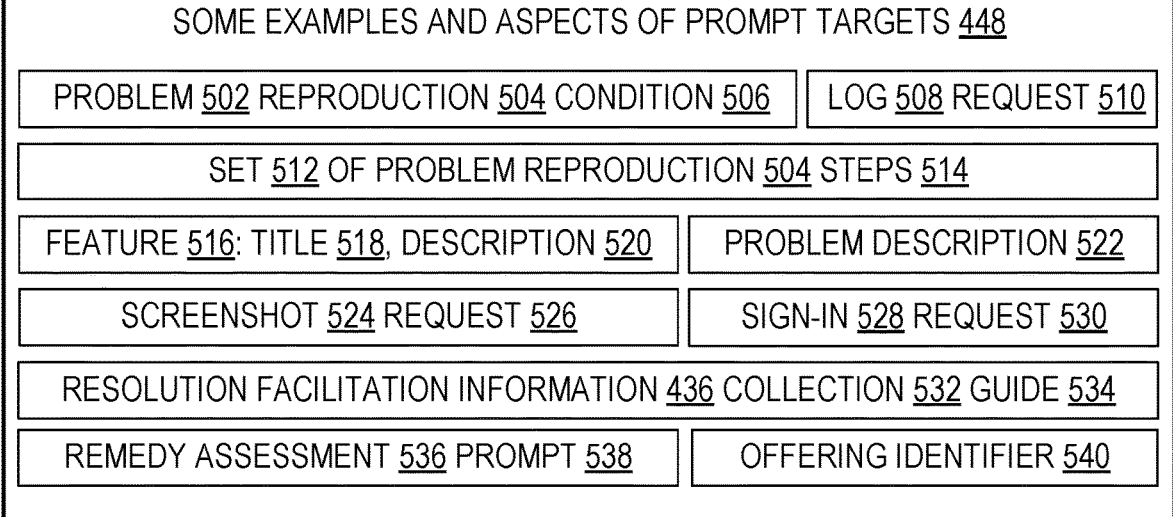
FIG. 5 is a block diagram illustrating some examples and aspects of language model prompt targets.

FIG. 5 shows some examples and aspects of language model prompt targets 448 suitable for use in generating quality ticket data enrichments 314. This is not a comprehensive summary of all examples or aspects of quality ticket data enrichment language model prompt targets 448 or prompts 316. FIG. 5 items are discussed at various points herein, and additional details regarding them are provided in the discussion of a List of Reference Numerals later in this disclosure document.

The other figures are also relevant to systems 202. FIGS. 6 and 7 illustrate methods of functionality 204 operation in systems 202.

In some embodiments, the enhanced system 202 is networked through an interface 124. In some, an interface 124 includes hardware such as network interface cards, software such as network stacks, APIs, or sockets, combination items such as network connections, or a combination thereof.

Some embodiments include a quality ticket enrichment computing system 202 which includes: a digital memory 112, and a processor set 110 including at least one processor, the processor set in operable communication with the digital memory. The system 202 also includes a vector database interface 308 which upon execution by the processor set accesses a vector database 210 which is associated with quality ticket data 306.

In this example, the system 202 also includes a data enricher 312, which is configured to, upon execution by the processor set, calculate an embedding vector 208 from at least a portion of an incoming quality ticket 134, submit the embedding vector to the vector database interface, receive a search result 310 from the vector database interface, and enrich at least one ticket with a data enrichment 314. The at least one enriched ticket includes the incoming quality ticket or a search result ticket which is a part of the search result, or both.

In this example, the data enrichment 314 includes at least one of: a user intent identification 404, a workaround suggestion 412, a resolution description 440, a target audience description 420, a relevance description 408, an impact description 416, a description of missing resolution facilitation information 436, an association 422 between the incoming quality ticket and the search result ticket, a user sentiment identification 426, a tag suggestion 428, or a feedback utility estimate 444.

This list of data enrichments 314 is illustrative, not prescriptive. Its presence here does not mean that every embodiment necessarily provides each of these enrichments 314, or that every embodiment is configured to do so. Some embodiments are configured to provide only a proper subset of these example enrichments, e.g., only one of them, or only two of them, and so on, up to all but one of them. Other embodiments are configured to provide each of these ticket data enrichments 314 at some point in their execution.

In some embodiments, the only ticket used to determine the data enrichment is the incoming quality ticket. For example, in some embodiments the data enrichment includes at least one of: the user intent identification 404, the user sentiment identification 426, or a user identification 446. These enrichments 314 can be determined from the incoming quality ticket itself regardless of search results 310 that may also derive from the incoming quality ticket.

In some embodiments, a user intent identification 404 is produced from the incoming quality ticket or a portion thereof using statistics, natural language processing, a language model 212, or a combination thereof. User intent 402 is also referred to as author intent 402. In some embodiments, intents 402 include one or more intents along the following lines: "report a problem", "report a crash", "request a feature", "report on product performance", "report unexpected product behavior", "look for a workaround", "look for a solution", "find out when a fix will be released", "offer information that may help other users", "complain about product documentation", "compare releases", or "compare products". Like other lists of examples herein, this list of example intents 402 is illustrative, not prescriptive. In some embodiments, the list of intents is updated dynamically via unsupervised learning from incoming tickets.

In some architectures, a language model 212 includes multiple constituent sub-models 212 which are chained together. In some, a language model 212 includes multiple constituent sub-models 212 which are invoked individually depending on the prompt target 448, e.g., one model 212 to identify user intent and another model 212 to identify user sentiment.

Some embodiments include a list of predefined user intent identifications 404 residing in the digital memory. The system 202 upon execution enriches the incoming quality ticket with at least one of the predefined user intent identifications.

In some embodiments, a user sentiment identification 426 is produced from the incoming quality ticket or a portion thereof using statistics, natural language processing, a language model 212, or a combination thereof. In some embodiments, sentiment 424 is classified only as positive/neutral/negative, but in some embodiments particular sentiments 424 are identified, such as anger, frustration, happiness, sadness, anxiety, or excitement.

Some embodiments include a language model interface 214, such as an API, and the system 202 upon execution submits at least a portion of the incoming quality ticket 304 to the language model interface with a prompt 316 that targets an aspect of the data enrichment 314, and in response receives at least a portion of the data enrichment from the language model interface.

For example, in some embodiments the prompt 316 includes a list of predefined user intents 402 and the incoming ticket, and asks the language model 212 to identify a user intent of the incoming ticket.

In some embodiments, the prompt 316 includes a list of predefined user sentiments 424 and the incoming ticket, and asks the language model 212 to identify a user sentiment of the incoming ticket.

In some embodiments, the prompt 316 includes a list of example tickets and the resolution information 436 they provide or fail to provide, plus the incoming ticket, and asks the language model 212 to identify which kind of resolution information 436 is missing from the incoming ticket.

In some embodiments, the language model 212 has been trained 740 via supervised learning with example tickets 134 and their respective utility estimates 444, and the prompt

316 includes the incoming ticket 304 and asks the language model 212 to provide a utility estimate 444 for the incoming ticket.

In some embodiments, the language model 212 has been trained 740 via supervised learning with example tickets 134 and their respective target audience descriptions 420, and the prompt 316 includes the incoming ticket 304 and asks the language model 212 to provide a target audience description for the incoming ticket.

In some embodiments, the language model 212 has been trained 740 via supervised learning with example tickets 134 and their respective tags 460, and the prompt 316 includes the incoming ticket 304 and asks the language model 212 to provide a tag suggestion 428 for the incoming ticket.

In some embodiments, the language model 212 has been trained 740 via supervised learning with example tickets 134 and their respective impact descriptions 416, and the prompt 316 includes the incoming ticket 304 and asks the language model 212 to provide an impact description for the incoming ticket.

In some embodiments, the language model 212 has been trained via supervised learning with example tickets 134 and their respective relevance descriptions 408, and the prompt 316 includes the incoming ticket 304 and asks the language model 212 to provide a relevance description for the incoming ticket.

In some embodiments, the language model 212 has been trained 740 via supervised learning with example tickets 134 and their respective workaround suggestions 412, and the prompt 316 includes the incoming ticket 304 and asks the language model 212 to provide a workaround suggestion for the incoming ticket.

In some embodiments, the language model 212 has been trained 740 via supervised learning with example tickets 134 and their respective resolution descriptions 440 and the prompt 316 includes the incoming ticket 304 and asks the language model 212 to provide a resolution description for the incoming ticket.

More generally, in some embodiments the language model 212 has been trained 740 via supervised learning with example tickets 134 and example prompts 316 and their respective prompt targets 448. The prompt in response to the incoming ticket includes the incoming ticket 304 and a prompt target 448 and asks the language model 212 to provide output 318 for the incoming ticket corresponding to the prompt target.

For instance, in some scenarios the prompt 316 asks the language model to state whether the incoming ticket includes a prompt reproduction condition 506 and if it does not, to state whether similar (as determined internally by the language model) tickets include a prompt reproduction condition 506. If no prompt reproduction condition 506 was found in the incoming ticket and similar tickets include a prompt reproduction condition, then the system 202 enriches the incoming ticket with a suggestion 320 to the user that the ticket be edited to recite any conditions 506 on problem reproduction the user knows about.

More generally, in some scenarios the system 202 employs the language model 212 to determine whether the incoming ticket includes any of the following items, and whether similar tickets include such an item, and if they do but the incoming ticket does not, then the system suggests 320 to the user that the missing item be added to the incoming ticket: reproduction condition 506, log request 510, screenshot request 526, sign-in request 530, reproduction steps 514, reproduction information collection guide 534, offering identifier 540 (offerings include products and services), feature title 518, feature description 520, or problem description 522 (e.g., expected behavior and actual behavior).

In some embodiments, the prompt targets at least one of: the feedback utility 442 estimate 444; the user sentiment 424 identification 426; a set 512 of steps 514 for reproducing 504 a problem 502; a condition 506 for reproducing a problem; a feature 516 title 518; a feature 516 description 520; an offering 130 identifier 540; a problem 502 description 522; a workaround 410; a solution 432; a suggestion 320; a description 438 of missing 430 resolution 432 facilitation 434 information 436, the description including a log 508 request 510; a description 438 of missing 430 resolution 432 facilitation 434 information 436, the description including a screenshot 524 request 526; a request 530 that missing resolution facilitation information 436 be obtained when signed into 528 a product 130; a description 438 of missing resolution facilitation information 436; or a guide 534 to collecting 532 missing resolution facilitation information 436.

Other system embodiments are also described herein, either directly or derivable as system versions of described processes or configured media, duly informed by the extensive discussion herein of computing hardware.

Although specific goods and services quality ticket enrichment 606 architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of ticket enrichment 606 functionality 204, for example, as well as different technical features, aspects, mechanisms, software, expressions, operational sequences, commands, data structures, programming environments, execution environments, environment or system characteristics, or other functionality consistent with teachings provided herein, and may otherwise depart from the particular examples provided.

Processes (a.k.a. Methods)

Processes (which are also be referred to as "methods" in the legal sense of that word) are illustrated in various ways herein, both in text and in drawing figures. FIGS. 6 and 7 each illustrate a family of methods 600 and 700 respectively, which are performed or assisted by some enhanced systems, such as some systems 202 or another quality ticket enrichment functionality enhanced system as taught herein. Method family 600 is a proper subset of method family 700.

Some variations on FIG. 6 exclude calculation 602 of the embedding vector and instead utilize a previously calculated embedding vector for the database search 604. Some variations search 604 a database 210 using keywords, language model prompts, or other search criteria, instead of an embedding vector 208, or in some scenarios in addition to the embedding vector. These are merely examples of variations; as noted elsewhere, any operable combination of steps that are disclosed herein may be part of a given embodiment.

FIGS. 1 to 5 illustrate quality ticket enrichment system 202 architectures with implicit or explicit actions, e.g., authenticating user sign-in 528 requests, displaying a user interface 124, receiving data 134, 118 through a user interface, determining a user identification 446 based on account or login information, assigning ticket numbers or similar ticket identifiers to tickets, training a language model 212, or otherwise processing data 118, in which the data 118 includes, e.g., tickets 134, vectors 208, ticket data enrichments 314, language model prompts 316, language model output 318, logs 508, and screenshots 524, among other examples disclosed herein.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some situations a human 104 types in a ticket title or other ticket content 136. Regardless, no process contemplated as an embodiment herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 7. FIG. 7 is a supplement to the textual examples of embodiments provided herein and the textual descriptions of embodiments provided herein. In the event of any alleged inconsistency, lack of clarity, or excessive breadth due to an aspect or interpretation of FIG. 7, the text of this disclosure shall prevail over that aspect or interpretation of FIG. 7.

Arrows in process or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 700 action items are traversed to indicate the steps performed during a process may vary from one performance instance of the process to another performance instance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a person of skill considers a given sequence S of steps which is consistent with FIG. 7 to be non-operable, the sequence S is not within the scope of any claim. Any assertion otherwise is contrary to the present disclosure.

Some embodiments provide or utilize a quality ticket enrichment method 700 performed by a computing system 202. In this discussion and generally elsewhere herein, "method" is used in the legal sense and "process" is used in the computer science sense. This example method includes at least the following: calculating 602 an embedding vector 208 from at least a portion of an incoming quality ticket 304; searching 604 a vector database 210, the vector database having associated quality ticket data 136, in which searching 604 includes searching 604 for quality ticket data which relates to the incoming quality ticket, and searching 604 is based on at least the embedding vector; and enriching 606, with a data enrichment 314, at least one of: the incoming quality ticket, or a search result ticket 310, 134 which is a result of the searching. In this example, the data enrichment 314 includes at least one of: a user intent identification 404, a workaround suggestion 412, a resolution description 440, a target audience description 420, a relevance description 408, an impact description 416, a description 438 of missing resolution facilitation information 436, an association 422 between the incoming quality ticket and the search result ticket, a user sentiment identification 426, a tag suggestion 428, or a feedback utility estimate 444.

In a variation, the relevance description 408 and the impact description 416 are combined into a single data field 118. This combined field is referred to as relevance 406 (even though impact 414 is also represented), or referred to as impact 414 (even though relevance 406 is also represented), or referred to by some other name such as "importance", "pertinence", or "consequences". In some scenarios, impact or relevance has constituent aspects, e.g., impacted workloads, impacted development efforts, or impacted software or hardware components.

Some embodiments enrich 606 an incoming ticket with particular kinds of data 314 from a search result ticket, such as workarounds, resolutions, target audience, relevance, impact, or missing data the user could supply to help resolve the issue. In some embodiments, searching 604 produces the search result ticket, the method includes harvesting 702 at least a portion of the data enrichment 314 from the search result ticket, the method includes displaying 704 at least a portion of the data enrichment in the incoming quality ticket, and the data enrichment includes at least one of: the workaround suggestion 412, the resolution description 440 (a "resolution" or "solution" is a proposed fix, as opposed to a mere workaround), the target audience description 420 (e.g., "developers using macro metaprogramming"), the relevance description 408 (e.g., what the reported issue relates to), the impact description 416 (e.g., harm from the reported issue), or the description 438 of missing resolution facilitation information 436 (e.g., a log, screenshot, memory dump, or other data not yet provided by the incoming ticket that could help diagnose or resolve the issue reported in the incoming ticket).

Some embodiments use an AI language model 212 to generate the data enrichment. In some embodiments, enriching 606 includes submitting 708 at least a portion of the incoming quality ticket to a language model with a prompt 316 that targets data enrichment, and in response receiving 710 at least a portion of the data enrichment from the language model.

Some embodiments filter AI language model output to reduce the risk of passing hallucinations/fabrications, offensive language, or other unwanted content to a user or including unwanted content in a ticket. In some embodiments, the method 700 includes filtering 712 an output 318 of the language model and excluding 714 a portion of the output from the data enrichment 314. For example, in some scenarios, candidate workarounds and resolutions provided by the language model are automatically and proactively checked for consistency with official or other human-vetted product documentation, e.g., by asking a language model whether the candidate contradicts the documentation.

Some embodiments perform ticket data 136 summarization 728 at specified levels of granularity 730. The summarization activity includes scoping summarization of workarounds to tickets whose embedding vectors match the specified granularity, or prompting a language model for a summary of tags for tickets whose users are similar to a user identification in a prompt, for example. The granularity in some scenarios is implemented as a user set 452, and in some scenarios as a ticket set 456. Some examples of user sets 452 include accounting department users, Perl programming language users, users of a particular product feature such as spellchecker, etc. Some examples of ticket sets 456 include tickets requesting a feature, tickets discussing an existing feature, tickets less than a week old, tickets with positive user sentiment, tickets originating from a particular organization, tickets related to a particular offering, etc.

In some embodiments, calculating 602 the embedding vector includes basing 716 the embedding vector on at least one of: a user set 452 identification 454; or a ticket set 456 identification 458. In some embodiments, calculating 602 the embedding vector utilizes a TF-IDF vectorizer, which vectorizes text using a measure of originality of a word by comparing the number of times a word appears in ticket with the number of tickets the word appears in. TF stands for term frequency, and IDF stands for inverse document frequency. In some embodiments, calculating 602 the embedding vector utilizes a Bidirectional Encoder Representations from Transformers (BERT) language model 212, or another language model 212.

Some embodiments prioritize tickets for further processing based on at least harvested 702 data enrichment 314. This is different than prioritizing based on what the user types in, in the sense that the data 136 from which a priority is calculated 718 is obtained from a source other than the incoming ticket itself. However, in some scenarios the resulting priority 718 is the same.

As an example, in one case an incoming ticket is associated 422 with a set 456 of previous tickets by the search 604, e.g., when the incoming ticket and the set 456 have sufficiently similar embedding vectors for their titles. In this case, the incoming ticket has a neutral user sentiment 424, or in a variation no user sentiment 424 is assigned to the incoming ticket. However, the associated set 456 of previous tickets has a collective negative user sentiment 424. That same negative sentiment is then assigned to the incoming ticket and the assignment also results in a higher priority for the incoming ticket and for the associated set 456 of previous tickets.

In some embodiments, enriching 606 includes harvesting 702 at least a portion of the data enrichment from the search result ticket, and the method 700 includes prioritizing the incoming quality ticket or prioritizing the search result ticket or prioritizing both, wherein prioritizing is based on at least a result of harvesting.

As another example of prioritizing 718, in one case the incoming ticket is given a high priority based on the incoming ticket's user intent of reporting a bug in feature X of product Y. Then a previously received ticket is also given the high priority based on the previous ticket's intent of reporting the same bug in the same feature X of the same product Y.

Some embodiments search for, and display summaries of, similar tickets while the user is typing the incoming ticket. In some scenarios, while the user is typing, some or all related feedback tickets (summarized) are presented, so the user can see whether the feedback they are writing is already present in the feedback system.

In some embodiments, the method 700 includes getting 720 at least a portion of the incoming quality ticket via a user interface 124, and the calculating 602 and the searching 604 each chronologically overlap 722 the getting 720, and the method 700 includes displaying 706 at least a portion of the search result ticket in the user interface.

Some embodiments use an AI language model to check a ticket 134 for completeness or strength of feedback. Some systems 202 engineer prompts that summarize the feedback 134 and then check whether certain utility 442 qualities are present in the feedback ticket 134. Depending on the embodiment and the particular ticket 134, such ticket utility qualities 132 include one or more of: overall feedback strength or other worth as a utility 442 estimate 444, reproduction steps 514, description 520 of feature 516, description 522 of problem 502, potential workarounds 410, potential solutions 432, whether reproduction or resolution of the specific issue 502 requires logs 508 or other known data 524, 506, 528, 118 (e.g., specific resources for product teams such as Session ID or Resource ID) that is not included 430 yet in the ticket, a guide 534 for the user to collect 532 those data, or user sentiment 424 (e.g., positive or negative). In some scenarios, the guide 534 requests 530 an in-product sign-in occur in order to obtain facilitation data 118, 436 such as Session ID or Resource ID. In some embodiments, the language model 212 gives a short summarization of the feedback thus far and a short list of other data that would make the feedback better.

In some embodiments, enriching 606 includes submitting 708 at least a portion of the incoming quality ticket to a language model 212 with a set of prompts 316 that individually or collectively target an aspect of the data enrichment 314, and in response receiving 710 at least a portion of the data enrichment from the language model. In some of these embodiments, the set of prompts targets at least N ($0<N<=12$) of: a set 512 of steps 514 for reproducing a problem 502; a condition 506 for reproducing a problem 502; a feature title 518; a feature description 520; an offering identifier 540; a problem description 522; a suggestion 320; a description 438 of missing resolution facilitation information, the description including a log request 510; a description 438 of missing resolution facilitation information, the description including a screenshot request 526; a request 530 that missing resolution facilitation information be obtained when signed into a product; a description 438 of missing resolution facilitation information; or a guide 534 to collecting missing resolution facilitation information.

Some embodiments use an AI language model to check whether a proposed remedy would work. When the system 202 has a candidate solution for a feedback ticket's problem, the system searches for other feedback tickets to see if the candidate solution also fits there. Search 604 is done with the combination of the embeddings to find relevant feedback tickets. Then the system asks the language model 212 whether the problem described in the search result ticket is solved by the candidate solution, via prompt engineering.

In some embodiments, the incoming quality ticket 304 has a problem summary 522, and the data enrichment 314 includes (i.e., describes or otherwise identifies) a remedy 450. The remedy includes a workaround suggestion 412, a resolution description 440, or both. In this example, the method 700 includes submitting 708 at least a portion of the remedy and at least a portion of the problem summary to a language model 212 with a prompt 316, 538 to assess the remedy relative to the problem summary, and in response receiving 710 an assessment 536 of the remedy from the language model.

In some embodiments, the data enrichment 314 includes the association 422 between the incoming quality ticket 304 and the search result ticket 310, and enriching 606 the incoming quality ticket includes at least one of: displaying 724 a suggestion to merge 726 the incoming quality ticket and the search result ticket; or merging 726 the incoming quality ticket and the search result ticket.

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is be removable or not, and is volatile or not, depending on the embodiment, can be configured in the embodiment using items such as tickets 134, enrichment software 302, vectors 208, interfaces 124, data enrichments 314, language models 212, and prompts 316, in the form of data 118 and instructions 116, read from a removable storage medium 114 and/or another source such as a network connection, to form a configured storage medium. The configured storage medium 112 is capable of causing a computer system 202 to perform technical process steps for providing or utilizing quality ticket enrichment functionality 204 as disclosed herein. The Figures thus help illustrate configured storage media embodiments and process (a.k.a. method) embodiments, as well as system and process embodiments. In particular, any of the method steps illustrated in FIG. 6 or 7, or otherwise taught herein, may be used to help configure a storage medium to form a configured storage medium embodiment.

Some embodiments use or provide a computer-readable storage device 112, 114 configured with data 118 and instructions 116 which upon execution by a processor 110 cause a computing system 202 to perform a quality ticket enrichment method 700. This method 700 includes: searching 604 a vector database 210 for quality ticket data 136 which relates to an incoming quality ticket 304, the vector database having associated quality ticket data 136; and enriching 606, with a data enrichment 314, at least one of: the incoming quality ticket 304, or a search result ticket 310 which is a result of the searching; wherein the data enrichment 314 includes at least one of: a user intent identification 404, a workaround suggestion 412, a resolution description 440, a target audience description 420, a relevance description 408, an impact description 416, a description 438 of missing resolution facilitation information 436, an association 422 between the incoming quality ticket and the search result ticket, a user sentiment identification 426, a tag suggestion 428, or a feedback utility estimate 444.

In some embodiments, enriching 606 includes submitting 708 at least a portion of the incoming quality ticket to a language model 212 with a prompt 316 that targets data enrichment, and in response receiving 710 at least a portion of the data enrichment from the language model.

In some embodiments, enriching 606 include submitting 708 at least a portion of the incoming quality ticket to a language model 212 with a prompt 316 that targets an aspect of the data enrichment, and in response receiving 710 at least a portion of the data enrichment from the language model, and wherein the prompt 316 targets 448 at least one of: a set of steps 514 for reproducing a problem 502; or a condition 506 for reproducing a problem 502.

In some embodiments, enriching 606 include submitting 708 at least a portion of the incoming quality ticket to a language model 212 with a prompt 316 that targets an aspect of the data enrichment, and in response receiving 710 at least a portion of the data enrichment from the language model, and wherein the prompt 316 targets 448 at least one of: a feature title 518; a feature description 520; an offering identifier 540; a problem description 522; or a suggestion 320.

In some embodiments, enriching 606 include submitting 708 at least a portion of the incoming quality ticket to a language model 212 with a prompt 316 that targets an aspect of the data enrichment, and in response receiving 710 at least a portion of the data enrichment from the language model, and wherein the prompt 316 targets 448 at least one of: a description 438 of missing resolution facilitation informa-tion 436, the description including a log request 510; a description 438 of missing resolution facilitation informa-tion 436, the description including a screenshot request 526; a request 530 that missing resolution facilitation information 436 be obtained when signed into a product; a description 438 of missing resolution facilitation information 436; or a guide 534 to collecting missing resolution facilitation infor-mation 436.

Some Language Model Prompt Examples

Additional examples and information regarding language model prompts are provided below. Although the prompts do not expressly acknowledge them as trademarks, certain trademarks are utilized. No infringement or waiver of trade-mark rights is intended by their use in these examples. Visual Studio®, Azure®, and Microsoft® are marks of Microsoft Corporation, Openai® is a mark of OpenAI, Inc., and Github® is a mark of GitHub, Inc.

In the following example from an internal prototype, "searchFor" is the text a user has typed into an input box.

```
const stream = await openai.chat.completions.create({
    model: "gpt-3.5-turbo",
    messages: [
        { role: "system", content: "You are a helpful assistant speaking
concisely. Your purpose is to provide solutions for problems on Visual Studio or
Azure Developer forums. Users will only send you the title of their problem.
Respond in markdown format with important pieces emphasized with '**' and
code and menu titles in tickmarks (`)" },
        { role: "user", content: searchFor }
    ],
    stream: true,
});
```

In the following example based on another internal pro-totype, "inputString" is the text a user has typed into an input box.

```
`;
    try {
        const stream = await openai.chat.completions.create({
            model: "gpt-4",
            messages: [
                { role: "system", content: "You are a helpful assistant speaking
concisely. Your purpose is to structure information about a customer reported
problem on Visual Studio or Azure Developer forums. The information will contain
important info such as product version numbers, environment, and other
highlighted info. It will be used by internal Microsoft engineers to quickly
understand the problem a customer is reporting. Respond in markdown format
with important pieces emphasized with '**' and code in tickmarks (`)" },
                { role: "user", content: batchedPrompt }
            ],
            temperature: 0,
            stream: true,
        });
```

```
const batchedPrompt = `
    Given this text:
    ***
    ${inputString}
    ***
```

Respond to each of the below prompts. Return markdown formatted text with the following sections:

Steps to reproduce the issue

Expected behavior

Observed behavior

Consider adding this info

Prompts:

0. Summarize the steps to reproduce using numbered markdown list.

1. Summarize expected behavior.

2. Summarize observed behavior.

3. What are the top 3 additional pieces of information the author could provide to help others solve the problem?

In some scenarios the stream "false" option was also used. The preamble was sent in the "messages" field of the request body, and each message included a "role" and "content". An internal prototype sent a message with the role "system" and the preamble as the content, followed by a message which has the role "user" and the prompt(s) as content. Some prompts reflected this data structure.

Another internal prototype interaction with a language model included the following, which has been lightly edited to inactivate and redact URLs for privacy and for conformance with Patent Office requirements.

Given this Text:

```
***
Project where this behavior can be reproduced: https colon //github dot
com/username/projectname
Warnings can be seen e.g. in CI-build output: https colon //dev dot azure dot
com/ username/Open Source/_build/results?buildId=9999&view=results
How to reproduce:
        Download sources of https colon //github dot com/username/
projectname
        Open solution (do not open any source file in the editor)
        Rebuild solution
        => Error list shows 52 warnings
        Double click on some of the warnings
        => Source code opens in document window, warnings disappear.
Side effects:
        Set "WarningsAsErrors" to "nullable"
=> When the source code is open, the project can be compiled. When the source
documents are closed, or the solution is built via "MSBuild", the build fails!
***
```

Respond to each of the below prompts. Return only a JSON array of the responses where the index is the prompt's number and the value is the response.

Prompts:

0. Summarize the problem the author is facing in less than 3 sentences.
1. Were repro steps provided in the text?
2. What is the difference between the expected and observed behavior?
3. What are the top 3 additional pieces of information the author could provide to help others solve the problem?

Desired Format:

```
[ "", "", "", ""]
```

In response to the foregoing, the internal prototype produced the following language model output 318:

```
[
"The author is facing an issue where warnings in a project's build disappear when
source code files are opened in the editor, but reappear when the project is built
using 'MSBuild', and there's a side effect related to setting 'WarningsAsErrors' to
'nullable'.",
"Yes, repro steps were provided in the text.",
"The expected behavior is that warnings should persist even when the source
code is open, and the build should succeed with warnings. The observed
behavior is that warnings disappear when source code files are opened, and the
build fails when using 'MSBuild'.",
"The specific version of the development environment (IDE, MSBuild, etc.) being
used. Details about the warnings themselves (content, type, etc.). Any recent
changes made to the project or the environment that might have triggered this
behavior."
]
```

Additional Observations

Additional support for the discussion of quality ticket enrichment functionality 204 herein is provided under various headings. However, it is all intended to be understood as an integrated and integral part of the present disclosure's discussion of the contemplated embodiments.

One of skill will recognize that not every part of this disclosure, or any particular details therein, necessarily required to satisfy legal criteria such as enablement, written description, best mode, novelty, nonobviousness, inventive step, or industrial applicability. Any apparent conflict with any other patent disclosure, even from the owner of the present subject matter, has no role in interpreting the claims presented in this patent disclosure. With this understanding, which pertains to all parts of the present disclosure, examples and observations are offered herein.

In one scenario, a user interface displays text stating "You are reporting a problem for Online Store, and displays a ticket entry form. Tickets are also sometimes referred to as "reports" or "posts". In this example, Product represents a product name and Version represents a product version.

The user interface includes a Search First graphic with nearby text stating "Search, vote and comment on the duplicate problem to save time on reporting a new problem." The user interface also includes a Clear title graphic with nearby text stating "Provide clear titles and details, and share your research to help us understand your post." The user interface also includes a Separate issues graphic with nearby text stating "If you have multiple problems, submit multiple reports."

The ticket entry form includes a title text entry box with an instruction text stating "Please provide a clear title" and default content stating "Please add the title here (required)".

The ticket entry form also includes a problem description text entry box with an instruction text stating "Description" and default content stating "To increase our ability to provide a fix, please thoroughly explain the issue and clear reproduction steps." The ticket entry form also includes a Submit button.

In this example scenario, the user enters as the title: "Multi-line macros should expand or copy to multiple lines". The user interface displays a response: "We found 80 similar items. You can join an ongoing discussion instead of creating a new one" along with five titles of items deemed similar and a "Load more . . . " option. Upon receiving a selection indicating the current user's interest in similar items, or entry of a detailed description of the problem from the current user, the user interface displays a description from a similar post.

In this example scenario, the user enters a detailed description of the problem which includes an example of actual macro expansion and an example of desired macro expansion, along with a discussion. The discussion states "The macro expansion improvements in Product Version sound fantastic! However, according to this post <link> multi-line macros will copy or expand to a single line. This behavior makes debugging complex macros much more difficult, as the expanded code is very hard to read and errors and debugging will report the entire line. As someone who does a lot of macro metaprogramming, I cannot stress enough how useful this feature would be to me."

In this example scenario, the user interface also displays some AI-selected workarounds. One suggested workaround in this example involves using macro expansion and a separate line, one involves using a preprocessor directive to pass macro arguments as a string and then concatenate the macro definition to the arguments, and one involves using inline functions or templates.

In this example scenario, the user interface also displays a menu of impact descriptions, including: "I'm unable to use this version", "It's more difficult to complete my work", "It bothers me. A fix would be nice", "Other", "My work is severely impacted or blocked (internal only)", and "Multiple people on my team are impacted (internal only)". The user in this example selects "It bothers me. A fix would be nice".

In this example scenario, after the report is submitted the user interface also displays a Target Audience 418 description 420 "Developers using macro metaprogramming", and also displays Tags including #MacroExpansion and #Debugging.

In this example scenario, the user interface also displays an AI-generated Author intent: "The author is requesting that multi-line macros in Product Version should expand or copy to multiple lines instead of a single line, to make debugging easier and code more readable."

In this example scenario, the user interface also displays an AI-generated Relevance and Impact: "The current behavior of multi-line macro expansion in Product Version is causing difficulty in debugging and making the expanded code hard to read. The request is to have the macro copy/ expansion include the new lines from the macro definition for easier debugging and readability. This is considered important for users who do a lot of macro metaprogramming."

More generally, observations are offered here about summarization and automatic processing of user feedback.

Writing a good bug actionable bug report is hard, but sometimes not even needed. When a vendor can match bug reports easier by using AI, users spend less time writing bug reports, and the vendor spends less time triaging bug reports. Better technology for summarization and automatic processing of user feedback makes it easier to match duplicate bug reports, and easier to give a user suggestions when writing a bug report that may solves their problem without the vendor having to look at the issue.

Some embodiments leverage AI to help users, by writing better issue reports, deduplicating reports, or resolving the issue before it is added as new issue. In some embodiments, software 302 uses one or more embedding vectors from an incoming ticket to search existing tickets and then enriches one or more ticket(s). The incoming ticket is not necessarily complete; the vector can be calculated, and the search can be done while the user is typing the incoming ticket. After the search, the incoming ticket or a ticket found in the search, or both, is enriched by at least one of the items that are listed in the claim, e.g., user intent, workaround suggestion, etc. In some cases, an embodiment leverages a language model 212 to create a better ticket title, create a summarization of the issue for triage, suggest workarounds, suggest what to add to the bug ticket to get the issue resolved sooner, or provide information that helps identify duplicates.

Some embodiments capture the fact that another user is likely encountering a duplicate of problem noted in the incoming ticket, or a problem overlapping that problem. These embodiments capture details of that user, e.g., user identification 446, and that situation, e.g., reproduction steps 514 or conditions 506, in case there are subtle differences between instances of the problem that could help a product team resolve the problem more broadly.

Using a vector-based title content search, some embodiments compare the incoming ticket (vector-wise, or via language model summaries, or both) to determine enrichments 314 such as what to add in the feedback ticket, possible duplicate tickets, and intent of the user, e.g., what kind of issue is being reported and what more data to ask from the user.

Some embodiments utilize vector embedding, language model summarization, or both to produce ticket content 136 summaries 728. Summaries are utilized 732 in some cases for triage 734, e.g., identifying an issue, determining which product or support team should look at this issue, and determining sentiments. Summaries are utilized 732 in some cases as part of a frontpage display, in which a problem is summarized with translated descriptions in the user's language. Summaries are utilized 732 in some cases deduplication 736 because summaries make it easier to find duplicates. Some embodiments run 736 duplication detection on summaries. Summaries are utilized 732 in some cases for conformation that a description is correct (validation by a user, or by a model 212).

Some embodiments suggest 320 one or more of: workarounds, what to add to the ticket to get resolved sooner (as a hint, here is extra information to add), intent, tags, affect (a.k.a. sentiment 424), impact, other tickets that the user can compare to see if they cover same issue, or similar issues.

Some embodiments employ templated responses. When a user answers a question, the system creates a templated response based on the description in the answer.

Some embodiments suggest a prioritization of the ticket for the support team.

Some embodiments use prompt crafting to extract useful information that streamlines the process of handling issues by a vendor. In one example scenario, when a user starts typing a title of a feedback ticket, the system 202 starts calculating embedding vectors 208 based on the typed string. These vectors are used to search 604 for related feedback tickets in a vector database 210. This database 210 is built on earlier submitted feedback tickets that are summarized. The summarizations are saved for lookup later. While the user is typing, the most related feedback tickets (summarized) found by the search are presented to the user, so the user can see if the feedback they're writing is already present in the feedback system. If it is, the system can add the user feedback to an existing ticket.

If the feedback is not already present in the feedback system, some feedback systems 202 verify and check whether the system has enough information. In some scenarios, this includes checking for solutions, and verifying that the solution actually works. In some, it includes checking the quality of the feedback, so it becomes actionable by the vendor. Some systems confirm sufficient detail is present to understand the feedback. Some check the tone 424 of the feedback.

Some embodiments engineer prompts that summarize the feedback and then check whether certain qualities are present in the feedback ticket 304. Some systems 202 check for reproduction steps, a description of a feature or a problem, whether the specific issue requires or benefits from logs or other known data that is not included yet; some guide the user to collect those data. Such data includes, e.g., screenshots or logs.

Some embodiments summarize from different perspectives, that is, using different prompts, to help the user potentially solve the issue before the ticket is finished and submitted. In some scenarios, when a system 202 has located a candidate solution for a feedback ticket, the system searches for other feedback tickets to see if the solution fits there. This is done with the combination of the embeddings to find relevant feedback tickets, and then asking the language model if the ticket is solved by the solution, via prompt engineering.

In some embodiments, the system 202 is, or includes, an embedded system such as an Internet of Things system. "IoT" or "Internet of Things" means any networked collection of addressable embedded computing or data generation or actuator nodes. An individual node is referred to as an internet of things device 101 or IoT device 101 or internet of things system 102 or IoT system 102. Such nodes are examples of computer systems 102 as defined herein, and may include or be referred to as a "smart" device, "endpoint", "chip", "label", or "tag", for example, and IoT may be referred to as a "cyber-physical system". In the phrase "embedded system" the embedding referred to is the embedding a processor and memory in a device, not the embedding of debug script in source code.

IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage-RAM chips or ROM chips provide the only local memory; (e) no CD or DVD drive; (f) being embedded in a household appliance or household fixture; (g) being embedded in an implanted or wearable medical device; (h) being embedded in a vehicle; (i) being embedded in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

Technical Character

The technical character of embodiments described herein will be apparent to one of ordinary skill in the art, and will also be apparent in several ways to a wide range of attentive readers. Some embodiments address technical activities such as calculating 602 embedding vectors 208, searching 604 a database 210, and communicating 708, 710 with an AI language model 212, which are each an activity deeply rooted in computing technology. Some of the technical mechanisms discussed include, e.g., vector databases 210, language models 212, interfaces 124, 214, 308, and enrichment software 302. Some of the technical effects discussed include, e.g., ticket 134 deduplication 736, ticket 134 enrichment with information 436 that is likely to help resolve 432 the issue 502 described in the ticket, substantial reduction of cycle time between ticket entry and notification to the user of missing information 436 that is likely to help resolve 432 the issue 502 described in the ticket, ticket prioritization 718, and ticket 134 enrichment with data such as tags 460, audience descriptions 420, impact descriptions 416, relevance descriptions 408, workaround suggestions 412, and solution suggestions 440. Thus, purely mental processes and activities limited to pen-and-paper are clearly excluded. Other advantages based on the technical characteristics of the teachings will also be apparent to one of skill from the description provided.

One of skill understands that quality ticket enrichment is a technical activity which cannot be performed mentally, because it requires usage of computing system memory 112 and processors 110. This includes, for example, database searching 604 and communications 708, 710 with an AI language model 212. As disclosed herein, quality ticket enrichment also involves vectorizing ticket data 136, which cannot be performed mentally or manually. Moreover, mental or pen-and-paper activity cannot configure a computing system to perform summarization as described herein. One of skill also understands that attempting to perform quality ticket enrichment even in part manually would create unacceptable delays in program execution, and would introduce a severe risk of human errors that can cause program errors. People manifestly lack the speed, accuracy, memory capacity, and specific processing capabilities required to perform quality ticket enrichment.

In particular, software or hardware quality ticket enrichment is a part of computing technology. Hence, the quality ticket enrichment improvements such as functionality 204 described herein are improvements to computing technology.

Different embodiments provide different technical benefits or other advantages in different circumstances, but one of skill informed by the teachings herein will acknowledge that particular technical advantages will likely follow from particular embodiment features or feature combinations, as noted at various points herein. Any generic or abstract aspects are integrated into a practical application such as a user feedback system 202.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not.

Rather, the present disclosure is focused on providing appropriately specific embodiments whose technical effects fully or partially solve particular technical problems, such as how to find tickets that address the same problem, how to identify information that would be helpful but is missing from a ticket, how to distinguish a user's intentions, and how to reduce ticket handling cycle time. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, tools, peripherals, software process flows, identifiers, data structures, data selections, naming conventions, notations, control flows, or other implementation choices described herein. Any apparent conflict with any other patent disclosure, even from the owner of the present subject matter, has no role in interpreting the claims presented in this patent disclosure.

Note Regarding Hyperlinks

Portions of this disclosure refer to URLs, hyperlinks, IP addresses, and/or other items which might be considered browser-executable codes. These items are included in the disclosure for their own sake to help describe some embodiments, rather than being included to reference the contents of the web sites or files that they identify. Applicants do not intend to have any URLs, hyperlinks, IP addresses, or other such codes be active links. None of these items are intended to serve as an incorporation by reference of material that is located outside this disclosure document. Thus, there should be no objection to the inclusion of these items herein. To the extent these items are not already disabled, it is presumed the Patent Office will disable them (render them inactive as links) when preparing this document's text to be loaded onto its official web database. See, e.g., United States Patent and Trademark Manual of Patent Examining Procedure § 608.01 (VII).

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation GPU: graphical processing unit
GUI: graphical user interface
HTTPS: hypertext transfer protocol, secure
IaaS or IAAS: infrastructure-as-a-service
JSON: JavaScript® Object Notation (mark of Oracle America, Inc.).
LAN: local area network
OS: operating system
PaaS or PAAS: platform-as-a-service
RAM: random access memory
ROM: read only memory
TPU: tensor processing unit
UEFI: Unified Extensible Firmware Interface
UI: user interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Sharing a reference numeral does not mean necessarily sharing every aspect, feature, or limitation of every item referred to using the reference numeral. Omission of a reference numeral from a given piece of text does not necessarily mean that the content of a Figure is not being discussed by the text. The present disclosure asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud 138 may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" may also be used as a patent law term of art, e.g., in describing a process claim as opposed to a system claim or an article of manufacture (configured storage medium) claim. Similarly, "method" is used herein primarily as a technical term in the computing science arts (a kind of "routine") but it is also a patent law term of art (akin to a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Quality ticket enrichment operations such as calculating embedding vectors, searching a database, executing a language module, and many other operations discussed herein (whether recited in the Figures or not), are understood to be inherently digital. A human mind cannot interface directly with a CPU or other processor, or with RAM or other digital storage, to read and write the necessary data to perform the quality ticket enrichment steps 700 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user, and indicates machine activity rather than human activity. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this disclosure discusses various data values and data structures, and recognize that such items reside in a memory (RAM, disk, etc.), thereby configuring the memory. One of skill will also recognize that this disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as assessing, basing, calculating, deduplicating, describing, displaying, enriching, executing, filtering, getting, harvesting, identifying, merging, prioritizing, prompting, receiving, requesting, searching, submitting, suggesting, summarizing, tagging, targeting, triaging, utilizing, vectorizing (and assesses, assessed, bases, based, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest. Example verbs listed here may overlap in meaning or even be synonyms; separate verb names do not dictate separate functionality in every case.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other storage device or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory and computer readable storage devices are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe aspects of embodiments by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; includes one or more systems 102

101 machine in a system 102, e.g., any device having at least a processor 110 and a memory 112 and also having a distinct identifier such as an IP address or a MAC (media access control) address; may be a physical machine or be a virtual machine implemented on physical hardware 102 computer system, also referred to as a "computational system" or "computing system", and when in a network may be referred to as a "node" 104 users, e.g., user of an enhanced system 202

106 peripheral device 108 network generally, including, e.g., LANs, WANs, software-defined networks, clouds, and other wired or wireless networks 110 processor or set of processors; includes hardware 112 computer-readable storage medium, e.g., RAM, hard disks 114 removable configured computer-readable storage medium 116 instructions executable with processor; may be on removable storage media or in other memory (volatile or nonvolatile or both)

118 digital data in a system 102; data structures, values, source code, and other examples are discussed herein 120 kernel(s), e.g., operating system(s), BIOS, UEFI, device drivers; also refers to an execution engine such as a language runtime 122 software tools, software applications, security controls; computational 124 interface generally in a computing system; computational, digital; also applied to particular kinds of interfaces 126 display screens, also referred to as "displays"

128 computing hardware not otherwise associated with a reference number 106, 108, 110, 112, 114

130 offering, e.g., goods or services 132 quality of an offering, as embodied or described in a computing system; examples include behavior (actual or expected), durability, usability, security, cost, reliability, speed, ease of use, safety, interaction with other goods or services, privacy, performance characteristics, fitness, or the presence or absence of particular functionality 134 ticket in a computing system (digital data), also referred to as "report" or "post" or "quality ticket" or "feedback"; tickets describe or document quality that is present or lacking or desired or undesired in an offering; in some embodiments ticket are subject to updates, e.g., history, telemetry, offering integration, mockups, gamifications, votes, reactions, comments on a previously submitted ticket, workarounds, solutions, images, log information, environment information and other useful context for understanding a problem, issue, question, suggestion or request; these updates form part of the ticket for present purposes; tickets generally have a human origin, but some tickets are generated automatically (but may nonetheless be human-approved prior to submission)

136 ticket data; digital; data 118 that is present in a ticket or selectable for inclusion in a ticket 138 cloud, also referred to as cloud environment or cloud computing environment 202 enhanced computing system, i.e., system 102 enhanced with functionality 204 as taught herein 204 quality ticket enrichment functionality (also referred to as "ticket enrichment functionality" or "functionality 204"), e.g., software or specialized hardware which performs or is configured to perform steps 604 and 606, or steps 602-606, or steps 712, 714, and 606, or steps 720, 722, 602, and 604, or steps 702 and 606, or any software or hardware which performs or is configured to perform a novel method 700 or a computational quality ticket enrichment activity first disclosed herein

208 vector, e.g., hash or other numeric representation of text, data representing a point in an n-dimensional space; digital; sometimes referred to as a vector embedding or an embedding vector

210 database containing ticket data 136 which is indexed by vectors or otherwise searchable via vectors; digital

212 language model, e.g., neural network machine learning model trained for text transformation, large language model, word n-gram language model, recurrent neural network-based model, transformer architecture model

214 interface to a language model, e.g., API

302 ticket enrichment software, also referred to as enrichment software, e.g., software which upon execution performs or provides functionality 204

304 incoming ticket or portion thereof, e.g., in a user interface; digital

306 data 136 related to an incoming ticket, e.g., by an explicit association 422, or by virtue of being in a search result 310 of a search which was based on a vector or a model-generated summary of the incoming ticket

308 interface to a vector database 210, e.g., API

310 data resulting from a search 604 312 data enricher software; and example of software 302 which is specific to vector-based searching

314 data enrichment; ticket data 136 which belongs to one or more of the categories illustrated in FIG. 4 or otherwise denoted herein as data enrichment 316 prompt to a language model; digital text; 316 also refers to the computational activity of engineering a prompt to a language model

318 digital output produced by a language model in response to submission of a prompt to the language model

320 suggestion to a user, e.g., presented via a user interface as text; 320 also refers to the computational activity of displaying or otherwise presenting a suggestion via a user interface

402 user intent, as represented in a computing system

404 identification of one or more particular user intents; digital

406 relevance, as represented in a computing system

408 digital text representing a human-readable description of relevance

410 problem workaround, as represented in a computing system

412 digital text representing a human-readable suggestion of a workaround

414 impact, as represented in a computing system

416 digital text representing a human-readable description of impact

418 target audience, as represented in a computing system

420 digital text representing a human-readable description of target audience

422 ticket association, e.g., pointer, list or other set of ticket identifiers, in a computing system

424 user sentiment, as represented in a computing system; sometimes referred to as "tone" or "affect"

426 identification of one or more particular user sentiments; digital

428 digital text representing a human-readable suggestion of a tag

430 missing, e.g., not listed, not present, not shown as a part of

432 resolution of a problem, also referred to as a solution; as represented in a computing system

434 facilitation of resolution, e.g., aids or helps or supports resolution or makes resolution more likely

436 resolution facilitation info (a.k.a. information, data), as represented in a computing system; info that facilitates resolution; info 436 is understood to be relative to a given problem—info that is resolution facilitating for problem X is not necessarily resolution facilitating for problem Y; info 436 example include but are not limited to logs 508, screenshots 524, and data 528 obtained during a signed-in session

438 digital text representing a human-readable description of info 436

440 digital text representing a human-readable description of a resolution 432

442 utility of feedback, e.g., a measure of how useful the feedback is (or is expected to be) in addressing a problem; generated, e.g., by a language model in response to a prompt such as "respond by stating on a scale of 1 to 10 how useful the following information will likely be in solving the problem in text X"

444 an estimate of utility 442, e.g., numeric or low/medium/high; digital

446 username, account name, user number, badge number, or other digital identification of a user

448 target specified in a language model prompt, e.g., a particular kind of output sought; 448 also refers to the computational activity of targeting a particular kind of output, e.g., by engineering the prompt to elicit that kind of output

450 remedy; one or more of a workaround suggestion 412 or a resolution description 440

452 set of one or more user identifications 446, as represented in a computing system

454 digital identification of a user set 452

456 set of one or more ticket identifications 462, as represented in a computing system

458 digital identification of a ticket set 456

460 tag; digital

462 ticket identification, as represented in a computing system, e.g., ticket number

464 feature request, as represented in a computing system, e.g., digital text representing a human-readable description of a change to add or modify or remove a feature 516; 464 also refers to the computational activity of receiving, sending, generating, displaying, or otherwise processing a feature request

466 missing resolution info request, as represented in a computing system, e.g., digital text representing a human-readable description of a request for missing information 436; 466 also refers to the computational activity of receiving, sending, generating, displaying, or otherwise processing a missing resolution info request

502 problem, as represented in a computing system; an unexpected or unwanted aspect of offering quality according to a ticket 134; sometimes referred to as "issue" or "concern"; in some embodiments, feature requests or questions are considered to be problem descriptions

504 reproduction of a problem in a computing system; 504 also refers to the computational activity of reproducing a problem in a computing system 506 reproduction condition, e.g., a value or configuration or other state in a computing system which makes possible or facilitates reproduction of a problem 508 log in a computing system; digital 510 digital text representing a human-readable request for a log 512 set of steps 514, as represented in a computing system 514 steps to perform to reproduce a problem 502, or digital text representing a human-readable description of such steps 516 feature of an offering, e.g., as represented in a user interface, a command, or an output of the offering 518 feature title, e.g., "spell check", "macro expansion", "backward compatibility", etc.

520 digital text representing a human-readable description of a feature 516

522 digital text representing a human-readable description of a problem 502

524 screenshot in a computing system; digital 526 digital text representing a human-readable request for a screenshot 528 sign-in to an offering, also referred to as login or logging in or signing in; also refers to the computational state of being signed in as an authorized user, and to the computational activity of signing in; also refers to data whose availability is conditioned on being signed in 530 digital text representing a human-readable request that a sign-in be performed; the sign-in credentials themselves are not being requested, rather, the request is that authorized use of them be made as a precursor of further resolution steps 532 activity of collecting data, as represented in a computing system 534 digital text representing a human-readable description of data collecting 532

536 computational activity of assessing a candidate remedy with respect to a problem, or a digital result of such activity 538 a prompt 316 which targets remedy assessment, e.g., "respond by estimating on a scale of zero to one the likelihood that the remedy described above will solve the problem described below"

540 offering identifier, e.g., name, version number, as represented in a computing system 600 flowchart; 600 also refers to quality ticket enrichment methods that are illustrated by or consistent with the FIG. 6 flowchart or any variation of the FIG. 6 flowchart described herein 602 computationally calculate an embedding vector 604 computationally search a database using an embedding vector 606 computationally enrich a ticket using a result of search 604; computationally enrich a ticket, e.g., by adding data 136 to the ticket, by refining data 136 in the ticket to match data 136 of another ticket, or by providing an assessment, inventory, or other description of data 136 which is in the ticket or which is missing from the ticket 700 flowchart; 700 also refers to quality ticket enrichment methods that are illustrated by or consistent with the FIG. 7 flowchart, which incorporates the FIG. 6 flowchart and other steps taught herein, or methods that are illustrated by or consistent with any variation of the FIG. 7 flowchart described herein 702 computationally harvest data from a search result 310, e.g., by copying data 136 from a ticket identified by the search 704 computationally display data enrichment 314 or a portion thereof, e.g., via a user interface API 706 computationally display a ticket 134 or a portion thereof, e.g., via a user interface API 708 computationally submit a prompt or other data (e.g., training data, settings) to a language model 212, e.g., via an API 710 computationally receive output 318 from a language model 212, e.g., via an API 712 computationally filter output 318 of a language model 212, e.g., by comparing the output for prohibited words, scanning the output for personally identifiable information, or submitting the output to another model along with guidance such as human-vetted data (e.g., user manuals) and prompting for a response stating whether the first model's output is inconsistent with the guidance 714 computationally exclude data by deleting it, anonymizing it, not displaying it, or not including it in a forwarded copy 716 computationally base an embedding vector on specified data 718 computationally prioritize a ticket, e.g., by sorting tickets or by assigning a priority level for subsequent processing of the ticket 720 computationally get a portion of a ticket which is not the entire ticket, e.g., via an API 722 computationally overlap two or more specified operations or processes or steps, so they are performed concurrently (e.g., at least partly at the same time)

724 computationally suggest 320 certain tickets be merged 726 computationally merge tickets, e.g., so they have the same or overlapping data 136; in some cases, merger results in a single ticket having the combined content of the merged tickets 728 computationally summarize ticket data, e.g., by prompting a language model to provide a summary; in some cases the prompt specifies a min and max length, in some the prompt specifies a reading or educational level, and in some the prompt specifies a target audience for the summary 730 computational granularity of ticket summaries 732 computationally utilize a ticket(s) summary in a computing system 734 computationally triage tickets, e.g., to assign them to different processes for further processing 736 computationally deduplicate tickets, e.g., by removing similar or identical tickets based on similarity of ticket summaries 738 computationally execute a language model or other software 740 computationally train a language model 742 computationally check language model output for consistency with guidance material or with a candidate remedy or with output from another language model 744 any step or item discussed in the present disclosure that has not been assigned some other reference numeral; 744 may thus be shown expressly as a reference numeral for various steps or items or both, and may be added as a reference numeral (in the current disclosure or any subsequent patent application which claims priority to the current disclosure) for various steps or items or both without thereby adding new matter Conclusion In some embodiments, searches 604 based on an incoming ticket 304 identify quality ticket enrichment data 314 using a vector database 210. Language model 212 prompts 316 target 448 particular kinds of quality ticket data 136. The incoming quality ticket 304, or a search result ticket 310, or both, are enriched 606 using enrichment data 314, such as a user intent identification 404, a workaround suggestion 412, a resolution description 440, a target audience description 420, a relevance description 408, an impact description 416, a description 438 of missing resolution facilitation information 436, an association 422 between the incoming quality ticket and the search result ticket, a user sentiment identification 426, a tag suggestion 428, or a feedback utility estimate 444. The enrichment 606 reduces engineering and support burdens, and facilitates faster more effective resolution 432 of the problem 502 or the request 464 that is stated or implied in the incoming quality ticket 304. Duplicate tickets 134 are merged 736, 726 or removed 736. Tickets are prioritized 718. Missing problem resolution 432 information 436 is identified and requested 466 sooner.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; it is not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A quality ticket enrichment method performed by a computing system, the method comprising:
calculating an embedding vector from at least a portion of an incoming quality ticket;
searching a vector database, the vector database having associated quality ticket data, wherein the vector database searching comprises searching for quality ticket data which relates to the incoming quality ticket, and the vector database searching is based on at least the embedding vector; and
enriching, with a data enrichment, the incoming quality ticket by displaying at least a portion of the data enrichment in the incoming quality ticket;

wherein the data enrichment is based at least on the quality ticket data which relates to the incoming quality ticket; and
wherein the data enrichment comprises at least one of: a user intent identification, a workaround suggestion, a resolution description, a target audience description, a relevance description, an impact description, a description of missing resolution facilitation information, an association between the incoming quality ticket and a search result ticket which is a result of the vector database searching, a user sentiment identification, a tag suggestion, or a feedback utility estimate.

2. The method of claim 1, further comprising:
harvesting at least a portion of the data enrichment from the search result ticket;
wherein the data enrichment comprises at least one of:
the workaround suggestion;
the resolution description;
the target audience description;
the relevance description;
the impact description; or
the description of missing resolution facilitation information.

3. The method of claim 1, wherein enriching the incoming quality ticket comprises:
submitting at least a portion of the incoming quality ticket to a language model with a prompt that targets data enrichment, and in response receiving at least a portion of the data enrichment from the language model.

4. The method of claim 3, further comprising:
filtering an output of the language model and excluding a portion of the output from the data enrichment.

5. The method of claim 1, wherein calculating the embedding vector comprises:
basing the embedding vector on at least one of:
a user set identification; or
a ticket set identification.

6. The method of claim 1, wherein enriching the incoming quality ticket comprises:
harvesting at least a portion of the data enrichment from the search result ticket; and
wherein the method further comprises:
prioritizing the incoming quality ticket or prioritizing the search result ticket or prioritizing both, wherein prioritizing is based on at least a result of harvesting.

7. The method of claim 1, comprising:
getting at least a portion of the incoming quality ticket via a user interface, wherein the embedding vector calculating and the vector database searching each chronologically overlap the getting; and
displaying at least a portion of the search result ticket.

8. The method of claim 1, wherein enriching the incoming quality ticket comprises:
submitting at least a portion of the incoming quality ticket to a language model with a set of prompts that individually or collectively target an aspect of the data enrichment, and in response receiving at least a portion of the data enrichment from the language model; and
wherein the set of prompts targets at least three of:
a set of steps for reproducing a problem;
a condition for reproducing a problem;
a feature title;
a feature description;
an offering identifier;
a problem description;
a suggestion;

a description of missing resolution facilitation information, the description including a log request;

a description of missing resolution facilitation information, the description including a screenshot request;

a request that missing resolution facilitation information be obtained when signed into a product;

a description of missing resolution facilitation information; or a guide to collecting missing resolution facilitation information.

9. The method of claim 1, wherein the incoming quality ticket has a problem summary;

wherein the data enrichment comprises a remedy, the remedy comprises a workaround suggestion, a resolution description, or both; and wherein the method further comprises:

submitting at least a portion of the remedy and at least a portion of the problem summary to a language model with a prompt to assess the remedy relative to the problem summary, and in response receiving an assessment of the remedy from the language model.

10. The method of claim 1, wherein the data enrichment comprises the association between the incoming quality ticket and the search result ticket; and wherein enriching the incoming quality ticket comprises at least one of:

displaying a suggestion to merge the incoming quality ticket and the search result ticket; or merging the incoming quality ticket and the search result ticket.

11. A quality ticket enrichment computing system, comprising:

a digital memory;

a processor set comprising at least one processor, the processor set in operable communication with the digital memory;

a vector database interface which upon execution by the processor set accesses a vector database which is associated with quality ticket data; and a data enricher which is configured to, upon execution by the processor set, calculate an embedding vector from at least a portion of an incoming quality ticket, submit the embedding vector to the vector database interface, receive a search result from the vector database interface, and enrich with a data enrichment the incoming quality ticket using the search result by adding at least a portion of the data enrichment in the incoming quality ticket;

wherein the data enrichment comprises at least one of: a user intent identification, a workaround suggestion, a resolution description, a target audience description, a relevance description, an impact description, a description of missing resolution facilitation information, an association between the incoming quality ticket and the search result ticket, a user sentiment identification, a tag suggestion, or a feedback utility estimate.

12. The quality ticket enrichment computing system of claim 11, wherein the data enrichment comprises at least one of:

the user intent identification;

the user sentiment identification; or a user identification.

13. The quality ticket enrichment computing system of claim 11, wherein the digital memory stores a list of predefined user intent identifications; and wherein the data enricher is configured to, upon execution by the processor set, enrich the incoming quality ticket with at least one of the predefined user intent identifications.

14. The quality ticket enrichment computing system of claim 11, further comprising:

a language model interface;

wherein the system upon execution submits at least a portion of the incoming quality ticket to the language model interface with a prompt that targets an aspect of the data enrichment, and in response receives at least a portion of the data enrichment from the language model interface.

15. The quality ticket enrichment computing system of claim 14, wherein the prompt targets at least one of:

the feedback utility estimate;

the user sentiment identification;

a set of steps for reproducing a problem;

a condition for reproducing a problem;

a feature title;

a feature description;

an offering identifier;

a problem description;

a workaround;

a solution;

a suggestion;

a description of missing resolution facilitation information, the description including a log request;

a description of missing resolution facilitation information, the description including a screenshot request;

a request that missing resolution facilitation information be obtained when signed into a product;

a description of missing resolution facilitation information; or a guide to collecting missing resolution facilitation information.

16. A computer-readable storage device configured with data and instructions which upon execution by a processor cause a computing system to perform a quality ticket enrichment method, the quality ticket enrichment method comprising:

searching a vector database for quality ticket data which relates to an incoming quality ticket, the vector database having associated quality ticket data; and enriching, with a data enrichment, the incoming quality ticket by displaying a suggestion, which suggests editing the incoming quality ticket to include the data enrichment;

wherein the data enrichment is based at least on the quality ticket data which relates to the incoming quality ticket; and wherein the data enrichment comprises at least one of: a user intent identification, a workaround suggestion, a resolution description, a target audience description, a relevance description, an impact description, a description of missing resolution facilitation information, an association between the incoming quality ticket and the search result ticket, a user sentiment identification, a tag suggestion, or a feedback utility estimate.

17. The computer-readable storage device of claim 16, wherein enriching the incoming quality ticket comprises:

submitting at least a portion of the incoming quality ticket to a language model with a prompt that targets data enrichment, and in response receiving at least a portion of the data enrichment from the language model.

18. The computer-readable storage device of claim 16, wherein enriching the incoming quality ticket comprises:

submitting at least a portion of the incoming quality ticket to a language model with a prompt that targets an aspect of the data enrichment, and in response receiving at least a portion of the data enrichment from the language model; and wherein the prompt targets at least one of:

a set of steps for reproducing a problem; or a condition for reproducing a problem.

19. The computer-readable storage device of claim 16, wherein enriching the incoming quality ticket comprises:

submitting at least a portion of the incoming quality ticket to a language model with a prompt that targets an aspect of the data enrichment, and in response receiving at least a portion of the data enrichment from the language model; and wherein the prompt targets at least one of:

a feature title;

a feature description;

an offering identifier;

a problem description; or a suggestion.

20. The computer-readable storage device of claim 16, wherein enriching the incoming quality ticket comprises:

submitting at least a portion of the incoming quality ticket to a language model with a prompt that targets an aspect of the data enrichment, and in response receiving at least a portion of the data enrichment from the language model; and wherein the prompt targets at least one of:

a description of missing resolution facilitation information, the description including a log request;

a description of missing resolution facilitation information, the description including a screenshot request;

a request that missing resolution facilitation information be obtained when signed into a product;

a description of missing resolution facilitation information; or a guide to collecting missing resolution facilitation information.

* * * * *